United States Patent [19]
Okert

[11] 3,925,176
[45] Dec. 9, 1975

[54] APPARATUS AND METHOD FOR ELECTROLYTIC SEWAGE TREATMENT

[76] Inventor: Adolph P. Okert, N. 2916 Woodruff Road, Spokane, Wash. 99206

[22] Filed: Oct. 10, 1973

[21] Appl. No.: 405,151

[52] U.S. Cl. .................. 204/152; 204/149; 210/44
[51] Int. Cl.² .... C02B 1/82; B03D 1/02; C02C 5/12
[58] Field of Search ........ 204/149, 130, 152, 290 F; 210/44

[56] References Cited
UNITED STATES PATENTS

| | | | |
|---|---|---|---|
| 1,131,067 | 3/1915 | Landreth | 204/149 |
| 1,194,000 | 8/1916 | Dobyns et al. | 204/149 |
| 2,839,463 | 6/1958 | Vellas et al. | 204/149 X |
| 3,523,891 | 8/1970 | Mehl | 210/44 |
| 3,706,646 | 12/1972 | Gibson, Jr. et al. | 204/149 |
| 3,764,500 | 10/1973 | Gibson, Jr. et al. | 204/149 X |

*Primary Examiner*—John H. Mack
*Assistant Examiner*—A. C. Prescott
*Attorney, Agent, or Firm*—Kolisch, Hartwell, Dickinson & Stuart

[57] ABSTRACT

Water purification apparatus and method. In a specific embodiment, domestic sewage (exemplary of water from municipal, domestic or industrial sources which may be processed with the invention) is purified by passing the sewage through a hydraulic macerator to reduce mechanically the size of solid waste products entering the system, and to aerate the waste. The macerated sewage may then be passed through an electrolytic cell having a plurality of spaced metal electrodes. Within the cell, electrolysis of the sewage produces oxidizing agents effective to kill harmful bacteria and other microorganisms. The electrolysis converts the sewage into a form which is essentially free of the usual pathogenic fecal organisms including *Escherichia coli*, Staphlococcus sp., Bacillus sp., other coliforms, Sacchromycetes, various molds and other fungi.

8 Claims, 4 Drawing Figures

APPARATUS AND METHOD FOR ELECTROLYTIC SEWAGE TREATMENT

BACKGROUND AND SUMMARY OF THE INVENTION

The present invention relates generally to a method and apparatus for purifying contaminated waters, such as industrial waste effluent and domestic sewage, the water of swimming pools, etc.

Typically, treatment plants for domestic sewage and waste waters use either the activated sludge process, or the trickling filter process, both of which are based on the use of bacteria and other microorganisms to decompose organic sewage materials. Both processes suffer from a number of drawbacks, however. Since the facilities needed for these methods are comparatively large and expensive, neither process is well adapted for applications involving relatively small volumes of sewage or waste waters. In addition to requiring a relatively long start up and treatment time, bacterial treatment systems produce effluents which require additional treatment to kill harmful microorganisms, such as coliform bacteria, present in normal domestic sewage. Moreover, some materials present in sewage and industrial wastes tend to be resistant to biological attack, and pass through these systems relatively unchanged.

There is a need, therefore, for a purification or treatment system which can be practiced on a small as well as a large scale, with equipment which is relatively small and compact in relation to the volume of waste treated. Further, there is a need for a treatment system which produces an effluent essentially free of bacteria and other harmful microorganisms, and which meets established requirements for discharge into receiving waters.

One feature of the treatment system of the invention is that it enables the production of a liquid effluent having increased dissolved oxygen (DO), and decreased biochemical oxygen demand (BOD), chemical oxygen demand (COD), and nutrient levels.

Another feature of the system is that it can be practiced on nearly any scale using apparatus which is relatively compact compared with that needed for conventional treatment systems. Thus, for example, the system is particularly useful in treating low volume waste streams, or in applications where space is limited.

Still another feature of the system is that it enables more rapid purification of sewage and other waste waters than is possible with biological treatment systems, and may be readily started and stopped as required.

Another feature of the invention is the use of an electrolytic cell wherein the waste water being purified is subjected to electrolysis. The electrolysis is performed under conditions wherein "poisoning" of the site of the electrolysis is inhibited. The electrolysis is performed using relatively low voltages.

These and other features of the method and apparatus comprising the treatment system of the invention will become more apparent from a reading of the following description of a sewage treatment facility which embodies the invention, the description to be read in conjunction with the accompanying drawings, wherein.

Figure 1:
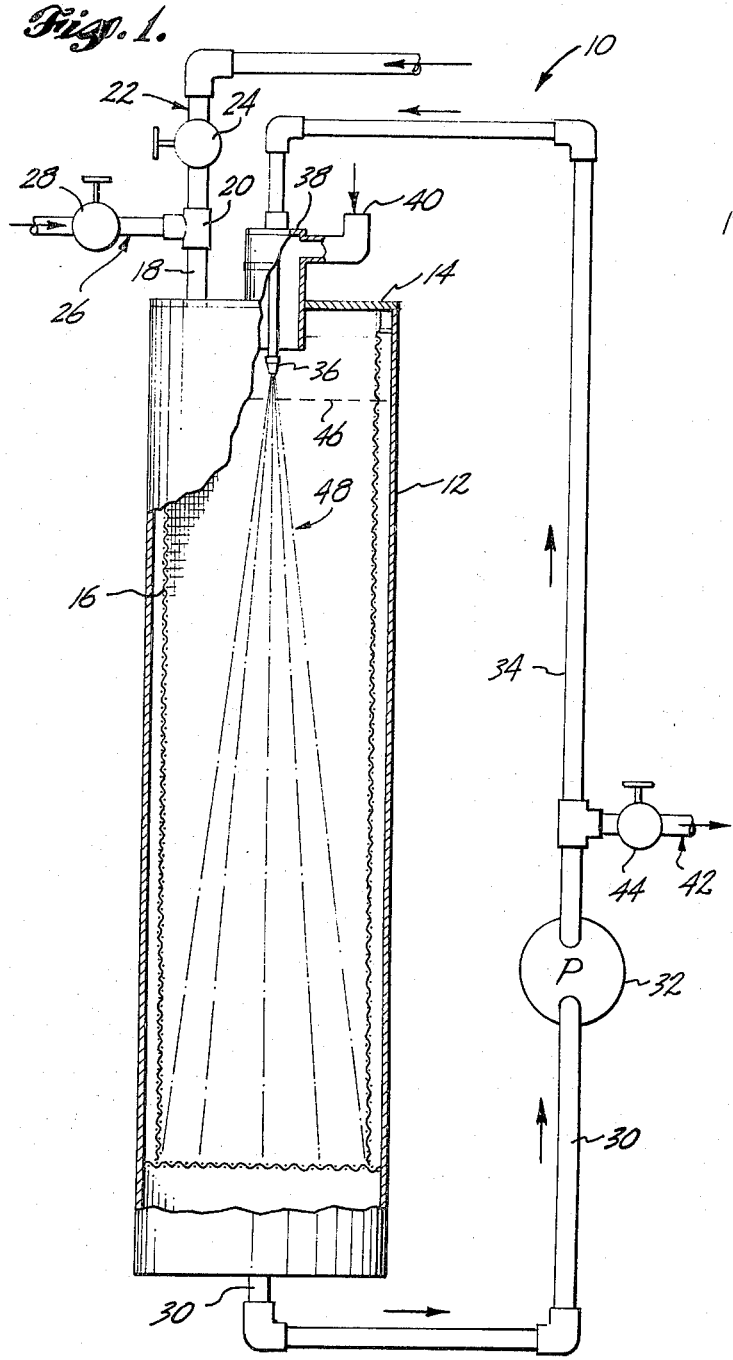
FIG. 1 is a side elevation, partially in section, of a hydraulic macerator and screening unit which may be used for initial or preliminary treatment of sewage.

In the sewage treatment system of the instant invention, preliminary breakdown of solid material in sewage may be accomplished by hydraulic maceration of the untreated whole sewage. A suitable hydraulic macerator for performing this function is shown in FIG. 1 of the drawings.

Briefly, the macerator, designated generally by reference numeral 10, comprises an enclosed cylindrical tank 12 having a removable cover plate 14. Centered within tank 12 is an opentop cylindrical mesh basket 16, suitably sealed around its upper perimeter to the cover plate. Tank 12 is provided with an inlet line 18 which connects through a tee 20 to an influent line 22 containing influent valve 24. Inlet line 18 also connects through tee 20 to a recycling line 26, which includes a shut-off valve 28. Tank outlet line 30 connects to the suction side of a recirculation pump 32. A return line 34 connects the pressure side or outlet of the pump to a spray nozzle 36 inside tank 12. As shown in FIG. 1, line 34 enters the tank through the top of a vent body 38 mounting an air vent 40. Also connected to the outlet of pump 32 is an effluent line 42 containing flow valve 44.

Briefly describing the operation of macerator 10, with influent valve 24 open and shut-off valve 28 closed, raw sewage enters the unit through influent line 22 and inlet line 18. As will be appreciated, solid material in the sewage having a size larger than the meshes in screen basket 16 will be retained within the basket. However, the liquid portion of the sewage (which includes most of the solids in suspension) will pass through the screen, carrying with it suspended material having a size smaller than the screen's meshes. Pump 32 withdraws liquid from the tank through outlet line 30 and returns it under pressure through line 34 to spray nozzle 36. With the sewage level within tank 12 maintained at about the level indicated by dashed line 46, the spray discharge from nozzle 36 produces considerable turbulence within the tank. This turbulence causes the breakdown or mechanical disintegration of solids in the sewage, allowing them to pass through the meshes in basket 16. In addition, the recirculation of the waste liquid through pump 32 and nozzle 36 creates a partial vacuum within the tank, drawing air into the tank through vent 40. This air becomes mixed with the sewage and promotes aerial oxidation of readily oxidizable material contained in the sewage.

Thus, macerator unit 10 functions to break down solids contained in the influent sewage stream and to screen out or retain those solids larger than a desired predetermined size. Waste material small enough to pass through the meshes in basket 16 is recirculated by pump 32 and subjected to further maceration and aerial oxidation. A portion of the recirculating material may be drawn off through discharge line 42 for further treatment.

With continued operation of maceration unit 10, solid materials which the unit cannot break down to a size small enough to pass through the screen will accumulate within basket 16. Although these materials may simply be removed from the basket after shutting down the macerator and removing cover plate 14, it may be desirable to first bleach and eliminate undesirable microorganisms in the solids before opening tank 12. As will be explained in greater detail later on, the effluent from the secondary treatment unit contains free available chlorine, ozone and other materials effective as bleaching agents and disinfectants. Thus, after a quantity of solid material, such as paper pulp, has accumulated within the basket, influent valve 24 may be closed, shutting off the flow of sewage into the macerator. Next, with recycling line 26 connected to receive effluent from the secondary treatment unit, valve 28 may be opened allowing the effluent to enter tank 12 through inlet line 18. After a period of recirculation of the effluent through unit 10 to bleach and eliminate undesirable microorganisms in the solids within the basket, the unit may then be shut down and the thus processed solids removed.

As should be apparent, the size of the macerator will depend upon the quantity of sewage which must be treated. It has been found, however, that a macerator having a cylindrical tank 12 with a diameter of about 10" and a height of about 40" is satisfactory for treating about 0.2 to 1.0 gal/min of domestic sewage. Basket 16 is formed of a screen material of at least about 40 mesh and preferably about 60 mesh (Tyler). To provide satisfactory turbulence of the liquid within tank 12, nozzle 36 is chosen to provide a conical spray pattern, generally indicated at 48 in the drawing, having a projected diameter at the bottom of basket 16 no greater than the basket's diameter. Recirculation pump 32 is preferably provided with a variable speed drive so that a constant output pressure of at least 50 psig can be maintained. In addition, the waste-bearing liquid within the tank is controlled at a level 46 about 1" below the outlet of spray nozzle 36. Macerator unit 10 is constructed of conventional materials selected using considerations well known to those of ordinary skill in the art.

TREATING APPARATUS OF FIG. 2

Figure 2:
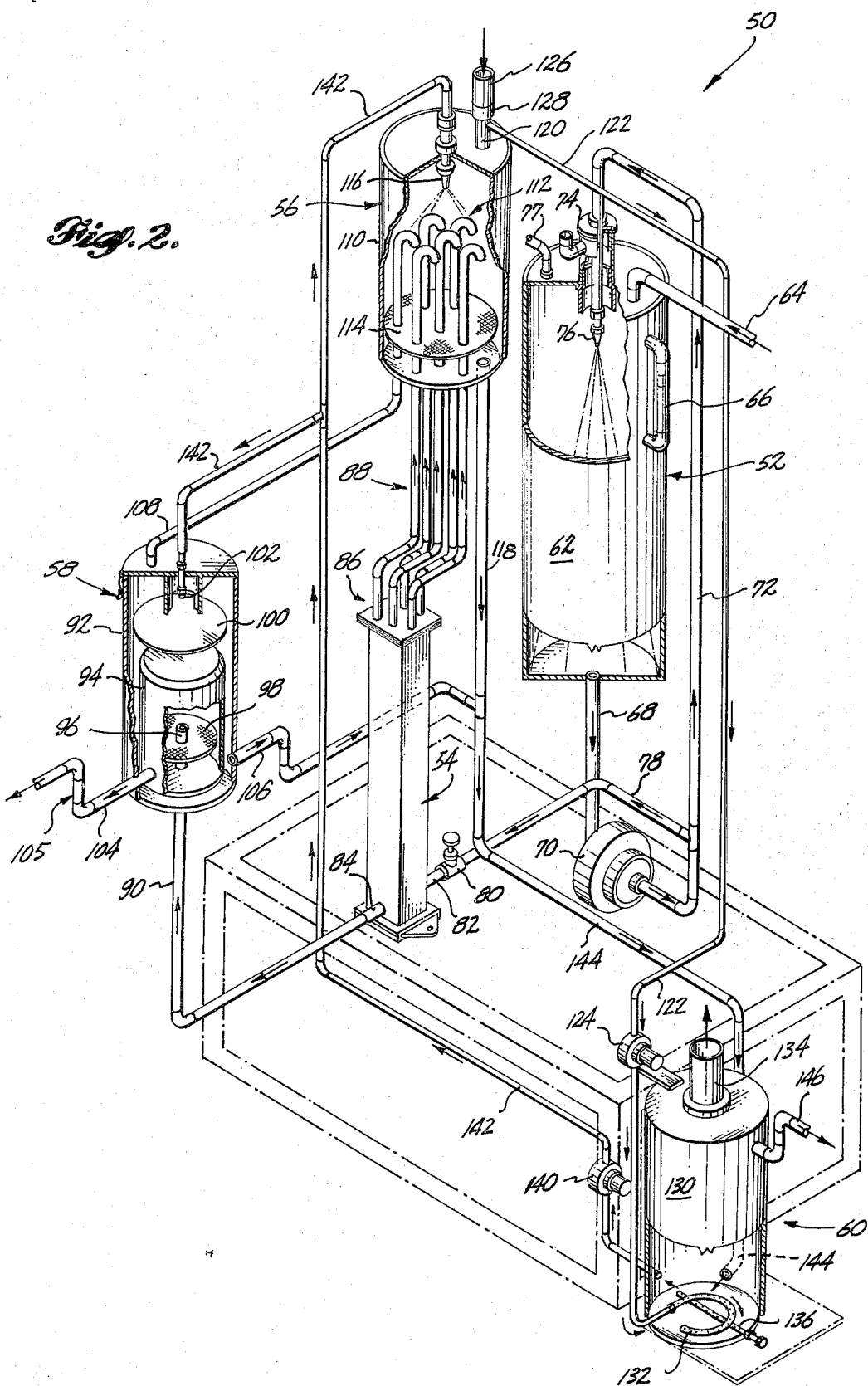
FIG. 2 is a perspective view of apparatus including another macerator, and an electrolytic cell and related components forming a secondary treating unit, portions having been removed to show details of construction.

Referring now to FIG. 2, apparatus designated generally as 50 is illustrated which includes a hydraulic macerator 52, and a secondary treating unit including an electrolytic cell 54, a foam breaker 56, a gas separator 58 and a gas scrubber 60. In FIG. 2, the arrangement and relative sizes of the components of the apparatus have been chosen for convenience in illustrating the invention, and the drawing should not be considered as showing in a precise scale a working system. For example, separator 58 and scrubber 60 have been enlarged somewhat to illustrate internal structure. In addition, as an ordinarily skilled artisan would appreciate, components have been omitted which are not necessary for an explanation of the invention. For example, no drive motor for pump 70 is shown, nor is a power supply for cell 54.

Macerator 52 may be similar in construction to hydraulic macerator 10 (FIG. 1), the particular macerator shown differing principally in that it does not include a screen basket such as basket 16. Thus, macerator 52 includes an upright cylindrical enclosed tank 62 which receives liquid-borne waste material through influent line 64. As described previously in connection with macerator 10, liquid is withdrawn from the bottom of the tank through an outlet line 68 by a pump 70 and returned to the tank through a return line 72 which enters the tank through air vent body 74. Spray nozzle 76 preferably has a conical spray pattern, generally indicated by dot-dash lines in the drawing, with a projected diameter at the bottom of tank 62 no greater than the tank's diameter. As in macerator 10, pump 70 preferably is chosen to provide a constant output pressure of at least about 50 psig, and the liquid level within the tank is maintained about 1" below the outlet of nozzle 76. For convenience in determining the level, tank 62 is provided with a sight glass 66. In addition, the tank is provided with an inlet 77 through which a salt solution may be added to control the conductivity of the waste liquid.

Macerated liquid waste is withdrawn from macerator 52 through discharge line 78, and passes through control valve 80 into inlet 82 of electrolytic cell 54. As will be described in greater detail later on, cell 54 includes a plurality of electrode plates forming substantially vertical enclosed channels. These channels are interconnected adjacent their ends to provide a serpentine flow path for the liquid passed therethrough between inlet 82 and outlet 84 of the cell. During electrolytic treatment of waste-bearing liquid flowing through the cell, a quantity of gaseous material, predominantly foam, is produced. To allow this foam to escape, cell 54 is provided with a plurality of vent tubes 86. The vent tubes are individually connected to foam breaker 56 by a plurality of vent lines 88.

After electrolytic treatment in cell 54, the treated liquid leaving the cell normally contains a quantity of entrained gases, mostly in the form of foam. These gases are removed from the cell effluent by a gas separator 58, which is connected by a line 90 to outlet 84 of the cell. As shown in FIG. 2, separator 58 comprises an upright cylindrical enclosure 92 containing a concentric interior baffle 94. Extending upward through the bottom of enclosure 92 is a riser 96 to which line 90 is connected. An annular screen 98 extends between the riser and the interior wall of baffle 94. A deflector 100 is suitably mounted intermediate the top of baffle 94 and a spray nozzle 102 which depends from the top of the enclosure. Effluent from cell 54 which, as just mentioned, contains a quantity of foam, is discharged through the upper end of riser 96. The liquid portion of the effluent drains through screen 98 and passes out of the separator through effluent discharge line 104. Discharge line 104 is provided with a vertical offset 105 to maintain the level of liquid within baffle 94 above annular screen 98. Foam from the effluent thus remains above the screen, eventually building up and overflowing baffle 94. A portion of the foam is broken up or collapsed by spray from nozzle 102, which is fed liquid from gas scrubber 60. Spray from the nozzle is deflected against the inner walls of the enclosure by deflector 100. Liquid from the spray and from broken foam collects in the annular space between enclosure 92 and baffle 94, and drains out through line 106 to return to the gas scrubber. Gases released from the foam, together with any excess foam not broken up by the spray, are vented to foam breaker 56 through vent line 108.

Vent line 108 and previously mentioned cell vent lines 88 are individually connected to individual ones of a plurality of risers 112 within enclosure 110 of the foam breaker. Foam from cell 54 and gas separator 58 is directed onto a screen 114 disposed in the lower portion of enclosure 110 as shown. The foam is broken up by spray from a nozzle 116, which is fed liquid from gas scrubber 60. The liquid component of the collapsed foam, together with he liquid discharged from nozzle 116, passes through screen 114 and is returned to the gas scrubber through drain line 118. Gases released from the broken foam are drawn off through outlet 120 and line 122 by a pump 124. For safety, the gases are reduced in concentration by diluting them with atmospheric air drawn in through a duct 126 connecting with outlet 120 and line 122. To prevent the gases from escaping to the atmosphere, a check valve 128 is provided between outlet 120 and duct 126.

The diluted gases from foam breaker 56 are pumped into a finely perforated dispersing tube 132 disposed adjacent the bottom of liquid-filled scrubber tank 130. The gases are released as small bubbles all along the length of tube 132, rise through the liquid in the tank and are discharged into the atmosphere through vent 134. Scrubber tank 130 is initially filled with fresh water introduced through a perforate inlet tube 136 disposed adjacent the bottom of the tank. Thereafter, a small, continuous flow of fresh water is maintained to prevent the water in the tank from becoming saturated with soluble gases. Water from scrubber tank 130 is pumped through supply line 142 to spray nozzles 102, 116 of gas separator 58 and foam breaker 56, respectively, by pump 140. Liquid from drain lines 106, 118 is returned to the tank through common drain line 144. Excess water containing dissolved gases is discharged from tank 130 through an overflow line 146.

ELECTROLYTIC CELL

Figure 4:
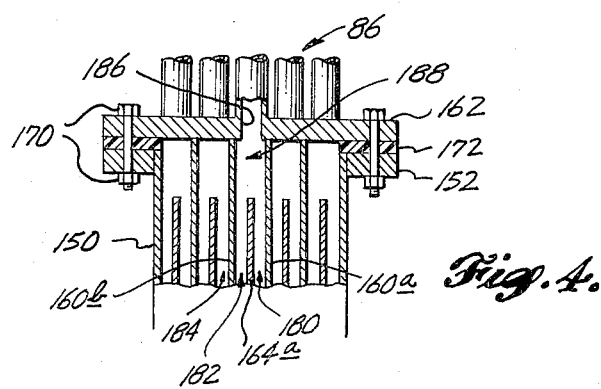
FIG. 4 is a side elevation view, partially in section, of the upper portion of the cell shown in FIG. 3.
Figure 3:
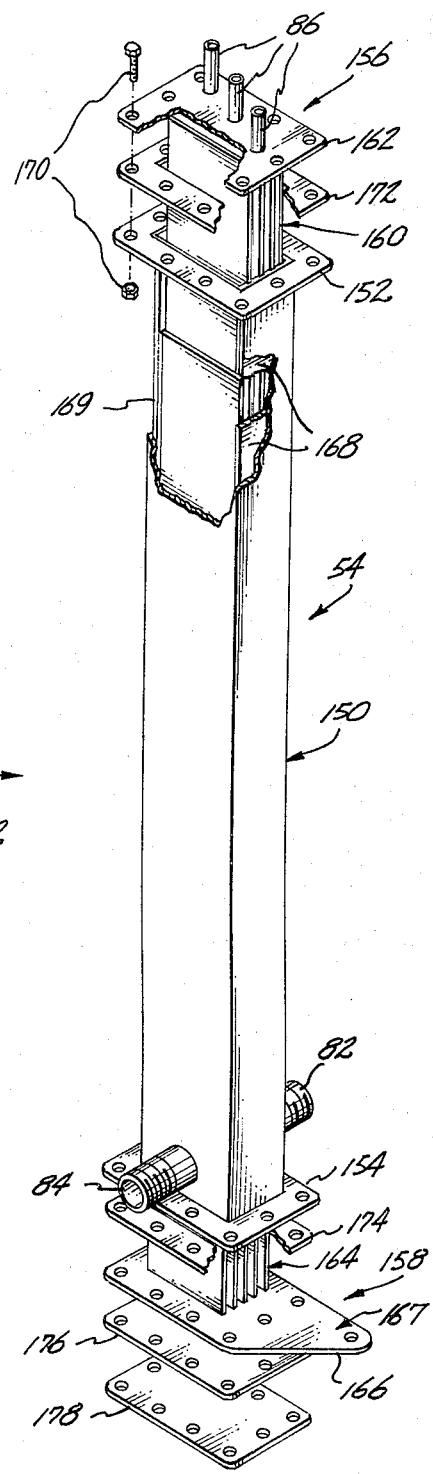
FIG. 3 is an exploded perspective view, partially cut away, of the electrolytic cell.

Referring now to FIGS. 3 and 4, electrolytic cell 54 includes an elongate hollow shell or casing 150 having a generally rectangular cross section. At either end the casing is provided with an outwardly projecting circumferential flange, including upper flange 152 and lower flange 154. Fluid inlet and outlet means 82, 84, respectively, are disposed in opposing face walls of casing 150 adjacent its lower end. Cell 54 includes a pair of electrode plate assemblies, cathode assembly 156 and anode assembly 158. Cathode assembly 156 comprises a plurality of parallel spaced, downwardly depending cathode plates 160 suitably attached to a cover plate 162. Similarly, anode assembly 158 comprises a plurality of parallel spaced, upwardly projecting anode plates 164 attached to a header plate 166. As best shown in FIG. 3, plate 166 includes a projecting "ear" portion 167 providing means to connect the anode plates to an appropriate electrical current source. Connection to the cathode plate is made through casing 150, which comprises part of the cathode structure in cell 54.

Within cell 54, each cathode plate 160 is disposed intermediate a pair of anode plates 164, as shown in FIG. 4. To maintain equidistant spacing between the electrode plates, a pair of grooved spacers 168, 169 is provided, one disposed along each of the casing's edge walls. Spacers 168, 169 preferably formed of an insulating material having good chemical resistance, such as "Teflon".

Cell 54 is assembled in a conventional manner, as with nut and bolt assemblies 170. Sealing gaskets 172, 174 are provided between the mating surfaces of cover plate 162 and flange 152, and header plate 166 and flange 154, respectively. An insulating gasket 176 is provided between the header plate and bottom cover plate 178 and, along with sealing gasket 174, serves to electrically isolate header plate 166. Gaskets 172, 174, 176 are most suitably a chemically resistant insulating material such as "Teflon".

As will be appreciated, each electrode pair consisting of an anode and an adjoining cathode form, together with spacers 168, 169, an elongate, substantially vertical enclosed channel. Thus, referring to FIG. 4, cathode plate 160a and anode plate 164a form, with grooved spacers 168, 169 (not shown) a channel 180. In like manner, anode 164a forms with cathode 160b a second channel 182. As mentioned previously, the channels in cell 54 are interconnected adjacent their ends to provide a tortuous, serpentine flow path for waste-bearing liquid between the inlet and outlet of the cell. In the embodiment of electrolytic cell 54 shown in FIGS. 3 and 4, the channels are interconnected by terminating alternate ones of the plates short of the ends of casing 150. Thus, still referring to FIG. 4, anode plate 164a terminates below the upper end of cell casing 150, interconnecting adjacent channels 180, 182. Similarly, cathode plate 160b terminates short of the lower end of the cell casing, interconnecting adjacent channels 182, 184. Liquid entering inlet 82 (FIG. 3) is forced to flow along a tortuous path between the inlet and outlet of the cell, with the path made up of alternate upwardly and downwardly extending vertical stretches.

During electrolytic treatment of liquid flowing through cell 54, gases are liberated which form a quantity of foam. To accommodate the escape of foam and other gaseous materials from the cell, discharge means is provided comprising a plurality of discharge ports, with at least one port disposed adjacent the upper end of each channel in the cell. Thus, again referring to FIG. 4, cover plate 162 is provided with a plurality of discharge ports, such as port 186, each opening into what may be thought of as a chamber 188 formed above the upper end of an anode plate 164, by a confronting pair of cathode surfaces. Each of the discharge ports communicates with an individual vent tube 86.

Utilizing the electrolytic cell of the instant invention, ordinarily relatively low voltages are applied between the cathode and anode assemblies. Thus, in the usual instance, the voltage applied need not exceed more than about 10 volts, with the typical voltage that has been utilized lying within the range of about 5 to 8 volts. The spacing between the plates in the electrolytic cell ordinarily is not great, with typically a spacing not exceeding about ¼" utilized except in applications with brine or sea water where greater spacings are applicable. With such a spacing and in the handling of sewage, the current drawn by the cell is usually no more than about 0.10 amp per square inch of surface area in an electrode, with good results typically obtained with a current draw of about 0.06 amps per square inch. In this connection, the usual sewage contains a certain amount of salt but if need be and to increase the conductivity of the sewage additional salt may be introduced to the sewage before processing.

A particular feature of the invention is that electrodes are used in the cell which essentially are not expended by the electrolytic process nor coated with products formed by the electrolysis in a manner which would have the effect of poisoning the site of the electrolysis. Thus, it is contemplated that the casing 150 and cathode assembly 156 comprising the cathode structure in the cell be made of titanium or type 304 stainless steel. Anode plates 164 and header plate 166 on the other hand are preferably made from titanium coated with ruthenium oxide $(RuO_4)$. For details concerning the construction of such an anode, reference is made to Beer, U.S. Pat. No. 3,632,498.

During electrolytic treatment of sewage and like materials, a number of electrolytic reactions take place within the cell. For example, electrolysis of the sewage generates nascent oxygen and chlorine, both of which act directly to kill bacteria and other microorganisms in the sewage. Chlorine gas is very soluble in water and hydrolyzes rapidly to form hypochlorous acid. In water, hypochlorous acid disassociates, forming hypochlorite ions, well known as powerful bleaching and disinfectant agents. Ozone, also active as a bleaching and germicidal agent, is generated within the cell, as are oxygen and hydrogen. Set forth below are chemical reactions exemplary of those occurring at the anode and cathode assemblies in the cell:

Some chemical reactions occurring at the anode assembly

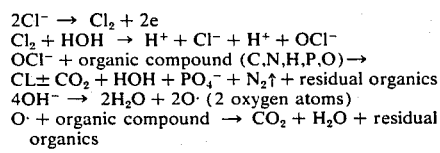

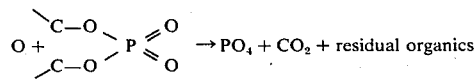

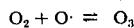

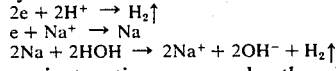

$O_2 + O\cdot = O_3$

Some chemical reactions occurring at the cathode assembly $2e + 2H^+ \rightarrow H_2\uparrow$
$e + Na^+ \rightarrow Na$
$2Na + 2HOH \rightarrow 2Na^+ + 2OH^- + H_2\uparrow$ Thus, in treating sewage by the electrolytic method of the invention, a number of gases are generated within cell 54 including hydrogen, chlorine and ozone. These gases, liberated from the cell largely as the gaseous constituent of foam, are controlled by collecting them in gas separator 58 and foam breaker 56. To eliminate any explosion hazard, the gases are diluted with air in line 122 as previously described. As the diluted gases are bubbled through water in the gas scrubber tank, the ozone disassociates to molecular oxygen. Chlorine gas is highly soluble and dissolves in the water, eliminating any problem with free chlorine gas being vented to the atmosphere. Some of the hydrogen combines with chlorine in the scrubber tank to produce hypochlorous acid. Hydrogen is vented to the atmosphere as through vent 134 to prevent the buildup of the gas in the system.

Effluent from the secondary treatment unit contains a quantity of free available chlorine in the form of hypochlorous acid and hypochlorite ion. In addition, the effluent contains a quantity of dissolved ozone. These materials are well known as bleaching agents and disinfectants. Thus, as previously described, the effluent may be recycled to macerator 10 for the bleaching of solids retained within basket 16 and the killing of bacteria therein.

The process of the invention is effective to eliminate in effluent from the system microorganisms such as bacteria, including coliform bacteria, molds, and other fungi. In addition, the process produces a significant reduction in BOD, COD, phosphate, and nitrogen compound levels. A very significant increase in dissolved oxygen also results.

EXAMPLE

By way of illustrating the effectiveness of the electrolytic treatment system of the invention, apparatus of the type generally illustrated in FIG. 2 of the drawings was fed effluent discharged from a domestic sewage treatment plant after mechanical disintegration, aeration and settling out of the bulk of the solids. To determine the effectiveness of the system, samples were taken of the sewage water entering the system through influent line 64, and of the effluent leaving the system through discharge line 104.

The cell that was utilized was approximately 2' tall, and included plates in the electrode assemblies of approximately 2" wide and 9/16" thick and the spacing between adjacent plates was about 1/16". The surface area of the plates in the anode assembly was 480 square inches. 6 volts direct current were applied to the cell and the current drawn was approximately 0.06 amps per square inch of said surface area. The flow rate of sewage through the cell was between ¼ and ⅓ gallon per minute.

The physical parameters of the sewage liquid entering the system and the effluent from the system were determined. The results are shown in Table I below, together with an indication of the change in each parameter. Where the change is not significant or not detrimental to the water, it is indicated as NS.

TABLE I

| Parameter | Before | After | Change |
|---|---|---|---|
| pH | 8.0 | 8.2 | NS |
| Conductivity, μmhos/cm | 500 | 1200 | +140% |
| Color, True APHA Units | 22 | 0.0 | −100% |
| Color, Apparent, APHA Units | 80 | 22 | −73% |
| Turbidity, FTU | 25 | 5 | −80% |
| % Transmission | 96.0 | 99.7 | NS |
| Optical Density | 0.0177 | 0.0013 | NS |
| Suspended Solids, mg/l | 71.7 | 5.0 | −93% |
| Settleable Matter ml/l | 5.0 | 0.3 | −94% |

Because of the addition of sodium chloride to the hydraulic macerator, the increase in conductivity shown in Table I was to be expected. Nevertheless, the conductivity falls into the lower range for acceptance into receiving bodies of water. Effluent from the system had none of the characteristic sewage odor, but rather had the odor of an ordinary swimming pool.

Next, standard chemical determinations were made on the sewage liquid entering the system and the effluent from it. The results are shown in Table II below.

TABLE II

| Parameter (mg/l) | Before | After | Change |
|---|---|---|---|
| Nitrogen, NH₃ | 5.4 | 0.43 | −92% |
| Nitrogen, NO₂+NO₃ | 21.3 | 10.4 | −51% |
| DO | 1.3 | 17.3 | +1230% |
| BOD | 16.3 | 5.4 | −67% |
| COD | 170 | 47 | −72% |
| Total PO₄ | 24.4 | 19.2 | −21% |
| Total Inorg. PO₄ | 22.7 | 18.9 | −16.7% |
| Total Org. PO₄ | 1.7 | 0.4 | −76% |
| Cl⁻ | 17.7 | 199.5 | NS |
| Cl₂, Total | 0.02 | 17.5 | |
| Cl₂, Free | 0.02 | 6.8 | |
| Cl₂, Combined | 0.00 | 10.7 | |

As shown in the table, the effluent from the treatment system is characterized as having greatly increased levels of dissolved oxygen, together with very significant decreases in biochemical oxygen demand, chemical oxygen demand, and nutrient levels (nitrogen and phosphate). Again, the increase in chloride level is anticipated because of the addition of salt to the hydraulic macerator. The salt concentration in the effluent is not considered excessive because typical surface waters may contain from 1.0 to 200 mg/l of chloride.

Tests were also made to determine the effects of the treatment system on microorganisms. Samples of the untreated sewage water were diluted 1:100 and plated on nutrient agar and violet red bile agar. The nutrient agar showed an excess of 300 colonies per plate, and the violet red bile agar confirmed the presence of fecal coliform bacateria, with 50 colonies per plate. Effluent from the treatment unit showed 0 colonies per plate. In addition, yeast, spore formers, gram negative and gram positive organisms were eliminated by the treatment system.

Separate samples of raw sewage were diluted 1:100 with sterile water, and with effluent from the treatment system. Streak plates on nutrient agar were made from each dilution. Considerable growth, in excess of 300 colonies, was produced on the plates made with sterile water. No colonies grew on plates streaked with effluent-diluted sewage water.

Many different types of waste fluids contain contaminants which are related to one or more of the contaminants commonly found in domestic sewage. It is thus apparent that the treatment system of the invention is also applicable to the treatment of such other fluids. In addition, the components of the treatment system may be used separately in other applications, if desired. For example, the electrolytic cell has utility in electrolytic fluid treatment methods quite different from that described above.

There is thus provided a method and apparatus for electrolytic sewage treatment having a number of advantages in comparison to conventional sewage treatment plants. Although a preferred embodiment has been described herein, it is understood that variations and modifications are possible without departing from the spirit of the invention.

What is claimed and desired to secure by Letters Patent is:

1. A method of processing sewage, comprising
   macerating said sewage,
   screening the macerated sewage through a screen,
   pasing the screened sewage through an electrolytic cell comprising an anode and a cathode between which said sewage passes,
   applying a voltage to said anode and cathode to electrolytically treat the sewage with the production of a gaseous foam within said cell,
   withdrawing said foam from said cell to separate the foam from the remainder of the sewage, and
   breaking up said foam to release gases contained therein.

2. The method of claim 1, including the step of scrubbing the gases releases from the gaseous foam to remove soluble components therefrom.

3. The method of claim 1, including the step of degassifying the electrolytically treated remainder of said sewage after it has passed through the cell.

4. A method of processing sewage, comprising
   screening a sewage stream to remove solid material therefrom,
   electrolytically treating the screened stream to thereby kill fecal microorganisms therein and to introduce a disinfecting character to the stream, and
   contacting the removed solid material with a portion of the electrolytically treated stream to thereby kill fecal microorganisms in said solid material.

5. The method of claim 4, wherein said electrolytic treating is done by passing the screened stream through an electrolytic cell.

6. A method of processing sewage comprising
   passing the sewage between the anode and cathode of an electrolytic cell where said anode and cathode are spaced not more than about ¼" from each other, and
   electrolytically treating said sewage by applying across said anode and cathode a DC voltage not exceeding about 30 volts and drawing in said cell a current not exceeding about 0.10 amp per square inch of surface area in said anode,
   said electrolytic treating being done with nonexpendable electrodes including an anode coated with ruthenium oxide.

7. A method of processing sewage comprising
   in a primary treatment of the sewage processing the sewage to remove solid material therefrom and leave a sewage remainder free of the solid material which has been removed, and
   in a secondary treatment of the sewage electrolytically treating the sewage remainder by passing the same between the anode and cathode of an electrolytic cell where said anode and cathode are spaced not more than about ¼" from each other, applying across said anode and cathode a DC voltage not exceeding about 30 volts, and drawing in said cell a current not exceeding about 0.10 amp per square inch of surface area in said anode,
   said electrolytic treating being done with nonexpendable electrodes including an anode coated with ruthenium oxide.

8. A method of processing sewage comprising
   in a primary treatment of the sewage processing the sewage to remove solid material therefrom and to leave a sewage remainder free of solid material which has been removed, and
   in a secondary treatment of the sewage electrolytically treating the sewage remainder by passing the same through an electrolytic cell comprising an anode and a cathode between which said sewage passes, applying a voltage to said anode and cathode to electrolytically treat the sewage remainder with the production of a gaseous foam within said cell, withdrawing said gaseous foam from said cell to separate the foam from the rest of the sewage remainder, and breaking up said foam to release gases contained therein.

* * * * *